United States Patent Office 2,700,902
Patented Feb. 1, 1955

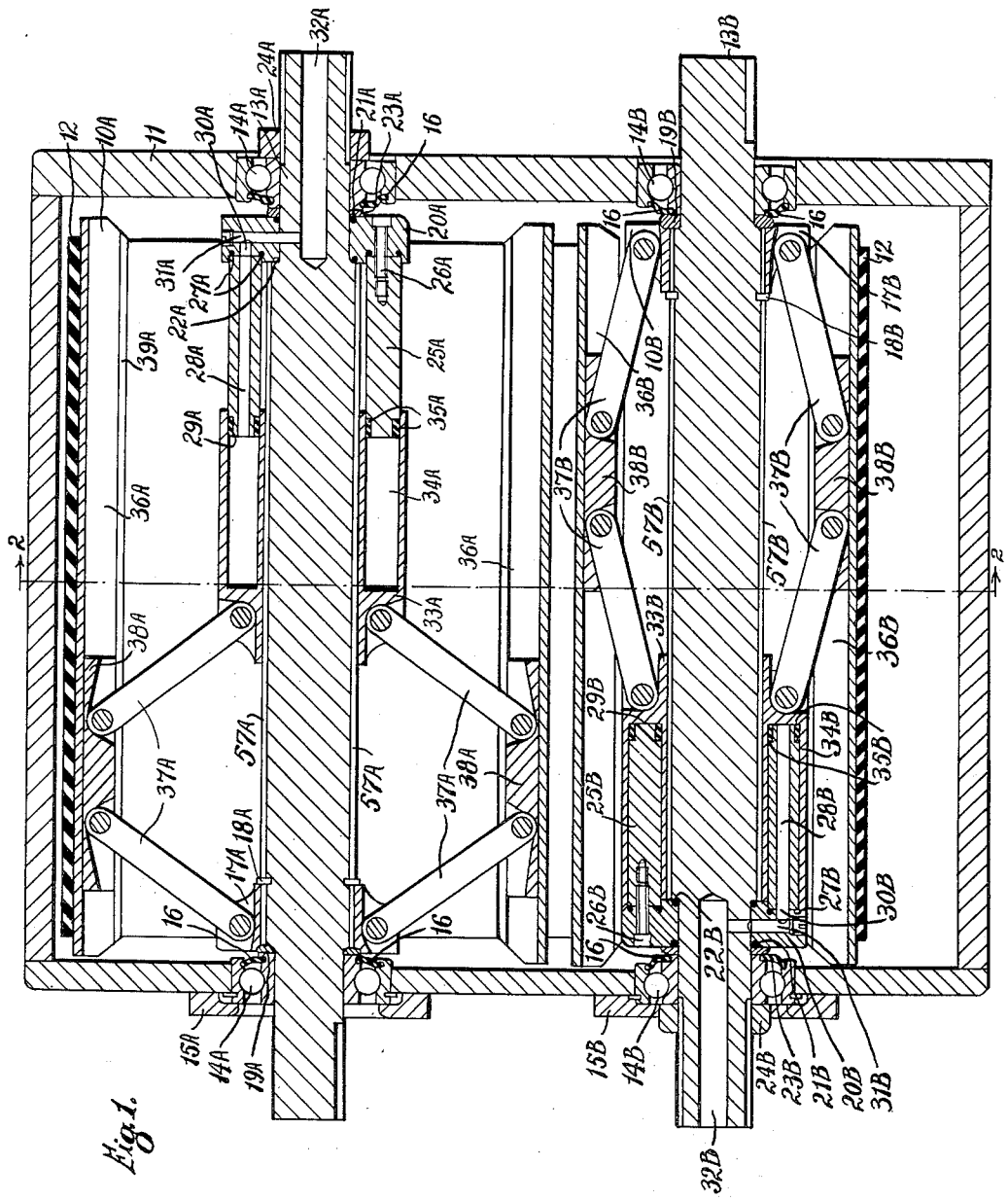

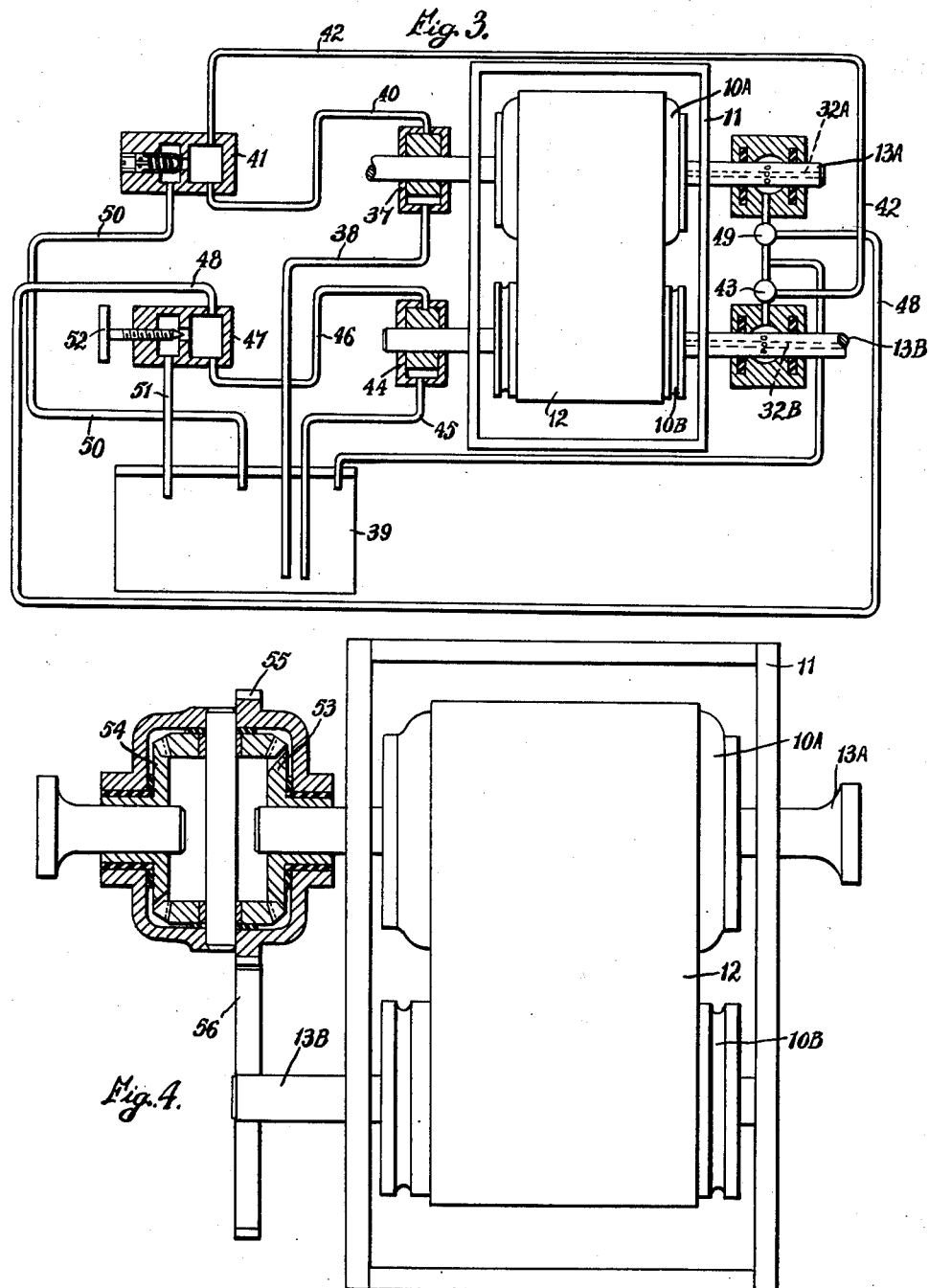

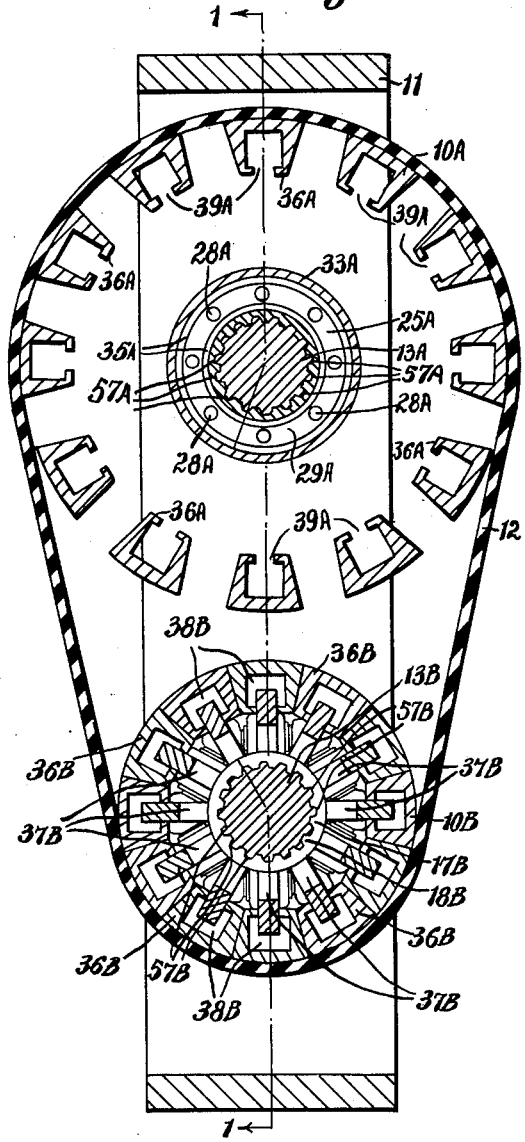

2,700,902

VARIABLE SPEED GEARING OF THE EXPANSIBLE PULLEY TYPE

Achille Carlo Sampietro, known as Achilles Charles Sampietro, Detroit, Mich.

Application November 9, 1951, Serial No. 255,564

Claims priority, application Great Britain November 20, 1950

5 Claims. (Cl. 74—230.2)

This invention relates to variable speed gearing of the expansible pulley type and its principal object is to provide a new expansible pulley construction for use in such gearing.

According to this invention, variable speed gearing of the expansible pulley type includes an expansible pulley comprising a pulley shaft, members disposed around the pulley shaft and providing a peripheral driving surface which is of general cylindrical form coaxial with the axis of rotation of the pulley, a piston and cylinder assembly adapted to move said members radially of the shaft to vary the diameter of the pulley, a linkage operatively connecting said members and said assembly and means for introducing fluid under pressure into the cylinder of the assembly for expanding the pulley.

A variable speed gear may comprise two such pulleys rotatably mounted within a supporting frame with their axes parallel, an endless flexible driving band connecting the two pulleys, means for connecting the cylinder of one pulley to a source of fluid under pressure, means for varying the fluid pressure in the cylinder of the said one pulley and means for relieving the fluid pressure in the cylinder of the other pulley.

A variable speed gear embodying the invention will now be described, by way of example, with reference to the accompanying diagrammatic drawings wherein:

Figure 1 is a section through a variable speed gear and taken on the line 1—1 in Figure 2;

Figure 2 is a section taken on the line 2—2 in Figure 1;

Figure 3 is a schematic diagram showing a control system for an expansible pulley variable speed gearing; and Figure 4 is a view partly in section and partly in elevation, of an expansible pulley variable speed gearing in parallel with a differential gear.

The variable speed gear consists of two radially expansible pulleys 10A and 10B mounted in a supporting frame structure 11, the drive between them being by means of an endless flexible band 12 of a reinforced rubber material. Suitable reinforcements for the band are, for example, woven steel mesh, fibre glass and woven nylon fabrics, one or more layers being used. It is found that such reinforced rubber materials can be prepared, which, whilst having good elastic properties, can withstand tensions of up to about 50,000 p. s. i.

The pulley 10A includes a shaft 13A rotatably mounted in two ball bearings 14A which are disposed one at each end of the shaft. One of the two bearings is held by a clamping ring 15A in a recess in one of the side walls of the frame structure 11. The other bearing is free to move axially in its recess in the other side wall to allow differential axial expansion of the shaft and the frame structure. Each bearing 14A is provided on the inner side of the ball-race with an oil-seal washer 16. The portions of the shaft projecting through the bearings 14A are reduced in diameter relatively to the portion between the bearings, thus forming a shoulder at each end of the shaft. The portion of the shaft between the two bearings is provided with longitudinal splines 57A and a fixed link-supporting hub 17A is mounted on the shaft abutting a retaining ring 18A on the shaft, the splines 57A preventing relative rotation between the shaft and the fixed hub. A spacing washer 19A is disposed on the reduced portion of the shaft between the fixed hub on one side and the inner member of the adjacent ball bearing on the other side. At the other end of the shaft a disc 20A is fitted on to the respective reduced portion of the shaft and abuts the adjacent shoulder. A sealing washer 22A is provided between the shoulder and the adjacent face of the disc 20A, which will hereafter be called the inner disc face, and seals the inner joint between them. The sealing washer 22A is located in a shallow annular groove in the said inner disc face. A second sealing washer 21A is located in a shallow annular groove in the other disc face, which will hereafter be called the outer disc face, and seals the outer joint between the shaft 13A and the disc 20A. The disc is pressed against the respective shoulder, and the second sealing washer 21A is pressed into its groove, by a spacing washer 23A, which abuts the second sealing washer on one side and the inner member of the adjacent ball race on the other side, and by a clamping nut 24A threaded on to the shaft.

An annular main groove coaxial with the shaft is formed in the inner face of the disc and a thick-walled tube 25A of uniform diameter has its inner annular end a push fit in the main groove. The tube is fastened to the disc by screws, such as 26A (Fig. 1), is coaxial with the shaft and has its inner cylindrical surface spaced from the adjacent portion of the shaft periphery. Two sealing washers 27A are located in two narrow annular grooves in the bottom face of the main groove and seal the two joints formed between the abutting side walls of the main groove and the tube 25A.

The tube constitutes the piston of a piston and cylinder assembly and is provided with a number of axial bores 28A which are formed in the thickness of its wall and have their axes parallel to the shaft axis. These axial bores open at one end into the inner annular surface 29A of the tube 25A and at the other end into registering axial bores 30A in the disc. Each axial bore 30A in the disc 20A opens into a radial bore 31A in the disc which in turn opens into a common axial bore 32A in the shaft 13A.

The cylinder of the assembly is constituted by a link-supporting hub 33A slidable axially on the splines 57A, the splines preventing relative rotation between the hub and the shaft. The hub has a deep annular groove 34A coaxial with the shaft formed in it and in which the tube 25A is a close sliding fit. The radially inner and outer surfaces of the tube are provided near to the inner end of the tube with piston rings 35A for forming in known manner a fluid-tight joint between the piston and the cylinder.

The interior of the cylinder formed by the hub 33A is in communication with a source (not shown in Figs. 1 and 2) of a suitable fluid under pressure by the bores 28A, 30A, 31A and 32A. A fluid-tight junction is obtained by any well known means between the common axial bore 32A in the rotatable shaft 13A and a stationary supply pipe leading to the said source. It will be apparent that as fluid is forced into the cylinder through the said axial and radial bores, the slidable hub 33A is moved axially along the pulley shaft 13A towards the fixed hub 17A at the other end of the shaft.

The peripheral driving surface of the pulley is constituted by the radially outer surfaces of a number of hollow, longitudinal rib members 36A spaced at regular intervals around the shaft, and having their longitudinal axes parallel to the shaft axis (for the sake of clarity some of these ribs are omitted from Fig. 1). The section of these members is such that when the pulley diameter is a minimum their surfaces abut each other and their radially outer surfaces form an uninterrupted cylindrical peripheral driving surface (see Fig. 2). Each rib member is connected to the fixed and slidable hubs by two links 37A each of which is pivoted at its ends to its associated fixed hub 17A or slidable hub 33A and to a runner 38A capable of sliding movement in the passage in the hollow rib member. The links pass through longitudinal slots 39A in the radially inner surfaces of the rib members. The arrangement of the linkage is such that as the slidable hub 33A is moved towards the fixed hub 17A all the rib members 36A are moved simultaneously radially outwards from the shaft, thus increasing the diameter of the pulley whilst maintaining a peripheral driving surface of general cylindrical form coaxial with the axis of the shaft. The rib members are maintained by the driving band 12 in their correct positions axially of the shaft.

The pulley 10B is of similar construction to the pulley 10A. Thus, shaft 13B of the pulley provided with splines 57B is mounted in bearings 14B, one of which is provided with a clamping ring 15B. Both bearings are provided with an oil seal washer 16. A fixed link-supporting hub 17B abuts a retaining ring 18B, a spacing washer 19B being disposed between the hub 17B and the adjacent bearing 14B. A disc 20B, sealing washers 21B and 22B, a spacing washer 23B and a clamping nut 24B are provided at the opposite end of the shaft 13B to the hub 17B. A thick-walled tube 25B is fixed to the disc 20B by screws 26B, sealing washers 27B being provided. The tube 25B is provided with axial bores 28B, and the disc 20B with axial bores 30B and radial bores 31B, the radial bores opening into a common axial bore 32B in the shaft 13B. The remainder of the pulley 10B comprises a slidable hub 33B with a deep annular groove 34B, piston rings 35B, hollow longitudinal rib members 36B having longitudinal slots 39B, and runners 38B.

Each pulley is expanded by forcing a suitable fluid and preferably a liquid, e. g. oil, into the cylinder in the slidable hub, the pulley diameter being determined by the pressure of the liquid in the cylinder. This pressure may be varied conveniently by varying the delivery pressure of the said source, e. g. by providing a metering orifice of variable cross-sectional area in the supply pipe from the source to the cylinder.

All the torque applied to the shaft or to the pulley periphery is transmitted through the linkage and its component parts and the pivoted joints must be sufficiently robust to withstand the maximum torque likely to be applied. In this embodiment, although the driving band is of a relatively elastic material, it is desirable that as one pulley increases in diameter the other pulley should so decrease correspondingly that any substantial increase in tension in the driving band is prevented. When liquid is supplied to the cylinder of one pulley and its diameter increases, the pressure of the band on the other pulley increases and, if the cylinder of the said other pulley is connected to a suitable relief valve, liquid will be forced from the cylinder and can escape to a reservoir.

An example of a suitable control for the gear is shown schematically in Figure 3. The shaft 13A of the driving pulley 10A constitutes the input shaft of the gearing and is rotated by a motor (not shown), the shaft driving a force pump 37 mounted thereon. A pipe 38 leads from an oil reservoir 39 to the pump 37, oil under pressure from the pump passing through pipe 40, pressure relief valve 41, pipe 42, two-way valve 43 and bore 32B in shaft 13 to the cylinder of the driven pulley 10B. A force pump 44 is mounted on the shaft 13B and is driven thereby, the pump being connected through a pipe 45 to the reservoir 39 and through a pipe 46, an adjustable orifice 47, a pipe 48, a two-way valve 49 and the bore 32A in the shaft 13A to the cylinder of the driving pulley 10A. Return pipes 50 and 51 to the reservoir 39 are provided for relief valve 41 and adjustable orifice 47 respectively. The shaft 13B constitutes the output shaft of the gearing.

The gear ratio is adjusted by operation of a handwheel 52 of the adjustable orifice 47. Clockwise rotation of the wheel 52 reduces the orifice, thus increasing the pressure of the oil supplied to the cylinder of the pulley 10A and causing it to increase in diameter. Oil escaping through the orifice passes through the pipe 51 to the reservoir 39. The increase in diameter of the pulley 10A causes an increase in the tension in the driving band 12 and a consequent increase in the pressure of the oil in the cylinder of the pulley 10B. This increased oil pressure opens the relief valve 41, allowing oil to flow through pipe 50 to the reservoir. The pressure of the oil in the cylinder of the pulley 10B is maintained by the pump 37 at a value determined by the relief valve 41, this value being sufficient to prevent the pulley from decreasing in diameter under normal working conditions.

A pulley such as that described above and of peripheral length 15 ins., minimum external diameter 5 ins., maximum external diameter 8½ ins., and utilising fluid pressures in the cylinder of the driving pulley of between about 20 and 100 p. s. i. can be arranged to work efficiently with torque inputs of up to about 250 to 300 pounds/foot. Variable speed gearing incorporating two such pulleys can multiply and divide torque by a factor of up to about 2.

The variable speed gear may be used in parallel with a differential gear, as shown in Figure 4. The pulley 10A has one end of its shaft 13A coupled to a first one 53 of the two sun pinions of the differential gear and its other end coupled to the means to be driven (not shown). The driving means (not shown) are coupled to the second sun pinion 54. The planet carrier gear wheel 55 of the differential gear meshes with a gear wheel 56 mounted on the shaft 13B of the pulley 10B, this latter shaft serving as a layshaft. Such a combined gear has the advantages that the torque load on the variable speed gear is reduced, and that variations in the speed ratio of the variable speed gear produce correspondingly greater variations in the speed ratio of the combined gear. Thus, assuming the speed of the shaft connected to the sun pinion 54 is $n_1$, the speed of the layshaft is $n_3$, the sun pinions 53 and 54 are of equal diameter and the speed ratio of the variable speed gear is $$\frac{n_3}{n_2}=K$$

then the speed $n_2$ of the shaft 13A will be given by the relation:

$$n_2=\frac{n_1}{2K+1}$$

It will be apparent that if the two sun pinions 53, 54 are not of equal diameter the integer 2 in the relation will be replaced by some other integer, which is not necessarily a whole number.

I claim:

1. Variable speed gearing of the expansible pulley type including an expansible pulley, comprising a pulley shaft, members disposed around the pulley shaft and providing a peripheral driving surface which is of general cylindrical form coaxial with the axis of rotation of the pulley, a piston and cylinder assembly mounted on the pulley shaft within the cylinder delimited by the said peripheral driving surface and adapted to move said members radially of the shaft to vary the diameter of the pulley, a linkage operatively connecting said members to the assembly and means for introducing fluid under pressure into the cylinder of the assembly for expanding the pulley.

2. Variable speed gearing of the expansible pulley type including an expansible pulley comprising a pulley shaft, members disposed around the pulley shaft and providing a peripheral driving surface which is of generally cylindrical form coaxial with the axis of rotation of the pulley, motive means mounted on the pulley shaft within the cylinder delimited by the said peripheral driving surface and comprising piston and cylinder elements of generally annular form encircling the shaft and coaxial therewith and slidable on the shaft relatively to one another in directions parallel to the axis of rotation of the pulley, linkage means operatively connecting said members to said motive means to move said members radially of the shaft to vary the diameter of the pulley, and means for introducing fluid under pressure into the cylinder element for expanding the pulley.

3. Variable speed gearing of the expansible pulley type including an expansible pulley comprising a pulley shaft, members disposed around the pulley shaft and providing a peripheral driving surface which is of general cylindrical form coaxial with the axis of rotation of the pulley, motive means mounted on the pulley shaft within the cylinder delimited by the said peripheral driving surface, and comprising piston and cylinder elements encircling the shaft and coaxial therewith, the cylinder element providing a cylinder of annular section and the piston elements providing a co-operating piston slidable in the annular-section cylinder, the elements being slidable relatively to one another on the shaft in directions parallel to the axis of rotation of the pulley, a pair of links for each of the members providing the peripheral driving surface, each link of the pair being pivotally connected at one end to the associated member, the other end of one of the links being pivotally connected to a movable element of said motive means, and the other end of the other link of each pair being pivotally connected to a hub fixed on the pulley shaft, said hub together with the pairs of links and the said movable element constituting an articulated linkage for moving said members radially of the shaft to vary the diameter of the pulley, and means for introducing fluid under pressure into the said annular section cylinder for expanding the pulley.

4. A variable diameter pulley for use in change speed gearing of the expansible pulley type, the pulley comprising a pulley shaft, members disposed around the pulley shaft and providing a peripheral driving surface which is of generally cylindrical form coaxial with the axis of rotation of the pulley, motive means mounted on the pulley shaft within the cylinder delimited by the said peripheral driving surface, said motive means comprising piston and cylinder elements of generally annular form encircling the shaft and coaxial therewith and slidable on the shaft relatively to one another in directions parallel to the axis of rotation of the pulley, a linkage means operatively connecting said members to a movable element of said motive means to effect movement of said members radially of said shaft and thereby vary the diameter of the pulley, and means for introducing fluid under pressure into the cylinder element for expanding the pulley.

5. Variable speed gearing as claimed in claim 3 wherein the said means for introducing fluid under pressure into the annular section cylinder comprise an axial bore in said shaft and radial bores leading from said axial bore to the interior of the cylinder.

References Cited in the file of this patent

UNITED STATES PATENTS

| 443,561 | Avery | Dec. 30, 1890 |
| 857,637 | Leiger | June 25, 1905 |
| 1,035,860 | Conradson | Aug. 20, 1912 |
| 2,161,894 | Bishop | June 13, 1939 |
| 2,164,818 | Heyer | July 4, 1939 |
| 2,198,940 | Heyer | Apr. 30, 1940 |

FOREIGN PATENTS

| 225,629 | Switzerland | May 17, 1943 |